US009591189B2

(12) United States Patent
Schack et al.

(10) Patent No.: US 9,591,189 B2
(45) Date of Patent: Mar. 7, 2017

(54) METHOD FOR ASSEMBLING A CAMERA

(71) Applicant: Axis AB, Lund (SE)

(72) Inventors: Göran Schack, Täby (SE); Johannes Rosenberg, Staffanstorp (SE); Magnus Bergkvist, Kristianstad (SE); Fredrik Sterngren, Lund (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 14/862,942

(22) Filed: Sep. 23, 2015

(65) Prior Publication Data
US 2016/0100082 A1    Apr. 7, 2016

(30) Foreign Application Priority Data

Oct. 1, 2014  (EP) ...................... 14187321

(51) Int. Cl.
*H04N 5/225*   (2006.01)
*B23K 26/22*   (2006.01)
*G02B 7/02*    (2006.01)

(52) U.S. Cl.
CPC ........... *H04N 5/2252* (2013.01); *B23K 26/22* (2013.01); *G02B 7/02* (2013.01); *H04N 5/2254* (2013.01); *B23K 2201/36* (2013.01)

(58) Field of Classification Search
CPC ............................ B23K 26/22; B23K 2201/36
See application file for complete search history.

(56) References Cited

U.S. PATENT DOCUMENTS

| 6,665,455 | B1* | 12/2003 | Ting ..................... | H04N 5/2252 348/373 |
| 8,577,217 | B2* | 11/2013 | Hu .......................... | G03B 3/10 359/824 |
| 2005/0179805 | A1 | 8/2005 | Avron et al. | |
| 2008/0084619 | A1 | 4/2008 | Lee | |
| 2009/0103193 | A1 | 4/2009 | Berube | |
| 2009/0129412 | A1 | 5/2009 | Kim | |
| 2013/0286283 | A1* | 10/2013 | Chou ................ | H02K 41/0356 348/374 |
| 2014/0009675 | A1* | 1/2014 | Chiu .................... | H04N 5/2253 348/374 |
| 2014/0205275 | A1* | 7/2014 | Kuo ..................... | H04N 5/2254 396/133 |

(Continued)

FOREIGN PATENT DOCUMENTS

DE          195 03 778 A1     8/1996
DE     10 2010 034 975 A1     2/2012

(Continued)

OTHER PUBLICATIONS

EP 14 18 7321.6 European Search Report (Nov. 11, 2014).

*Primary Examiner* — Timothy J Henn
(74) *Attorney, Agent, or Firm* — Volpe and Koenig, P.C.

(57) ABSTRACT

The present invention relates to a camera and a method for assembling a camera. The camera comprises a sensor, a lens, and a housing. The method comprises: adjusting a position of at least one of the sensor and the lens such that the sensor is positioned at a predetermined angle in relation to an optical axis of the lens, and laser welding the at least one of the sensor and the lens in relation to the housing such that the sensor and the lens are fixed in relation to each other.

6 Claims, 7 Drawing Sheets

(56) References Cited

U.S. PATENT DOCUMENTS

2014/0298642 A1* 10/2014 Sesti ................ G02B 7/025
                                                                         29/592.1
2014/0333829 A1* 11/2014 Lee ................ H04N 5/2251
                                                                         348/373

FOREIGN PATENT DOCUMENTS

| EP | 2 285 197 B1 | 3/2014 |
| WO | 2012032027 A2 | 3/2012 |
| WO | 2013017472 A2 | 2/2013 |

* cited by examiner

METHOD FOR ASSEMBLING A CAMERA

FIELD OF INVENTION

The present invention relates to a camera and a method for assembling a camera.

BACKGROUND

A camera usually comprises a lens and an image sensor. When putting together the camera, the lens and the image sensor are aligned. The parts of the camera may be fixed using gluing, preferably without destroying the alignment. Glue is easy to use but has disadvantages since viscosity of the glue may vary from one glue batch to another—or within one batch, and the glue might creep. Furthermore, glue is aging, both in its receptacle before applying the glue, but also after having glued the parts together. Glue with solvent may be used, but such types of glue give off gas, which may create fog on the inside of the camera dome and/or harm the components. UV hardening glue does not give off gas, but requires long hardening times.

Alternatively, the parts of the camera may be fixed by screwing the components together. However, screwing takes time and risks moving the components during screwing. Furthermore, the screws may loosen with time.

SUMMARY

In view of the above, an objective of the invention is to solve or at least reduce one or several of the drawbacks discussed above. Generally, the above objective is achieved by the attached independent patent claims.

According to a first aspect, the present invention is realized by a method for assembling a camera comprising a sensor, a lens, and a housing. The method comprises: adjusting a position of at least one of the sensor and the lens such that the sensor is positioned at a predetermined angle in relation to an optical axis of the lens, and laser welding the at least one of the sensor and the lens in relation to the housing such that the sensor and the lens are fixed in relation to each other. The adjusting can be performed using other references than the optical axis of the lens. an example, the step of adjusting may include aligning mechanically against a surface in the lens holder. Such mechanical alignment is particularly advantageous for cameras having exchangeable lenses.

Laser welding enables fixing the parts without influencing the positions of the lens and the sensor. Furthermore, it is a quick and durable fixing method.

The predetermined angle between the optical axis and the sensor may be 90°. Thus, the sensor may be perpendicularly arranged in relation to the optical axis of the lens.

The method may further comprise attaching at least one of the sensor and the lens to a carrier, and, before the step of adjusting: attaching at least one connection plate to the carrier. This is advantageous in that the carrier and the connection plate may be used for fixing the sensor and the lens in relation to each other.

The step of laser welding may comprise laser welding a portion of the at least one connection plate to the housing. This is advantageous in that the carrier is fixed in relation to the housing.

The at least one connection plate may have an opening. The method may further comprise: attaching the at least one connection plate to the carrier such that the opening of the at least one connection plate is aligned with an opening in the carrier. This enables inserting something through the openings. The at least one connection plate may be centered over the opening of the carrier around which it is attached.

The method may further comprise: arranging a first end of a peg in the opening of the at least one connection plate and in the opening in the carrier, a second end of the peg being attached to the housing, wherein the step of laser welding comprises laser welding the at least one connection plate to the peg. This enables adjusting a position of the carrier in relation to the housing before laser welding since there is some space between the peg and an edge of the opening of the connection plate.

The at least one connection plate may have an opening. The method may further comprise: arranging the at least one connection plate in a retainer such that an opening in the retainer is aligned with the opening of the at least one connection plate, and attaching the retainer to the carrier such that the opening of the retainer is aligned with an opening in the carrier. A retainer enables holding the connection plate in place during laser welding. Furthermore, the retainer provides further possible fixing points for laser welding.

The method may further comprise: arranging a first end of a peg in the opening of the at least one connection plate, in the opening in the carrier, and in the opening of the retainer. A second end of the peg may be attached to the housing. The step of laser welding may comprise laser welding the at least one connection plate to at least one of the peg and the retainer. This enables adjusting a position of the carrier in relation to the housing before laser welding since there is some space between the peg and a brim of the opening of the connection plate.

According to a second aspect, the present invention is realized by a camera comprising a sensor, a lens, and a housing. At least one of the sensor and the lens are laser welded to the housing such that the sensor and the lens are fixed in relation to each other.

The camera may further comprise at least one carrier and at least one connection plate, the at least one connection plate may be attached to the at least one carrier, and at least one of the sensor and the lens may be attached to the at least one carrier.

The at least one connection plate may have an opening, and the at least one connection plate may be attached to the at least one carrier such that the opening of the at least one connection plate is aligned with an opening in the carrier.

The camera may further comprise a peg having a first end arranged in the opening of the at least one connection plate and in the opening in the carrier, and a second end may be attached to the housing.

The camera may further comprise at least one carrier, at least one connection plate, and at least one retainer, the at least one connection plate may have an opening, the connection plate may be arranged in the retainer such that an opening in the retainer is aligned with the opening of at least one connection plate, the retainer may be attached to the carrier such that the opening of the retainer is aligned with an opening in the carrier, and at least one of the sensor and the lens may be attached to the at least one carrier.

The camera may further comprise a peg having a first end arranged in the opening of the at least one connection plate, in the opening in the carrier, and in the opening of the at least one retainer, and the peg may have a second end being attached to the housing.

The at least one retainer may have at least one pressing portion arranged to apply a resilient force on the at least one connection plate in a direction towards the carrier. This enables holding the connection plate in the aligned position during, e.g., laser welding.

The at least one retainer may have a peg portion arranged to apply a first resilient force to the peg, and a connection plate portion arranged to apply a second resilient force to the at least one connection plate in a direction which is opposite to the direction of the first resilient force. This enables holding the connection plate in the aligned position during, e.g., laser welding.

The advantages of the first aspect are equally applicable to the second. Furthermore, it is to be noted that the second aspect may be embodied in accordance with the first aspect, and the first aspect may be embodied in accordance with the second aspect.

Other objectives, features and advantages of the present invention will appear from the following detailed disclosure, from the attached claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated. Furthermore, the word "comprising" does not exclude other elements or steps.

BRIEF DESCRIPTION OF THE DRAWINGS

Other features and advantages of the present invention will become apparent from the following detailed description of a presently preferred embodiment, with reference to the accompanying drawings, in which.

DETAILED DESCRIPTION OF THE PREFERRED EMBODIMENTS

Figures 1A, 1B:
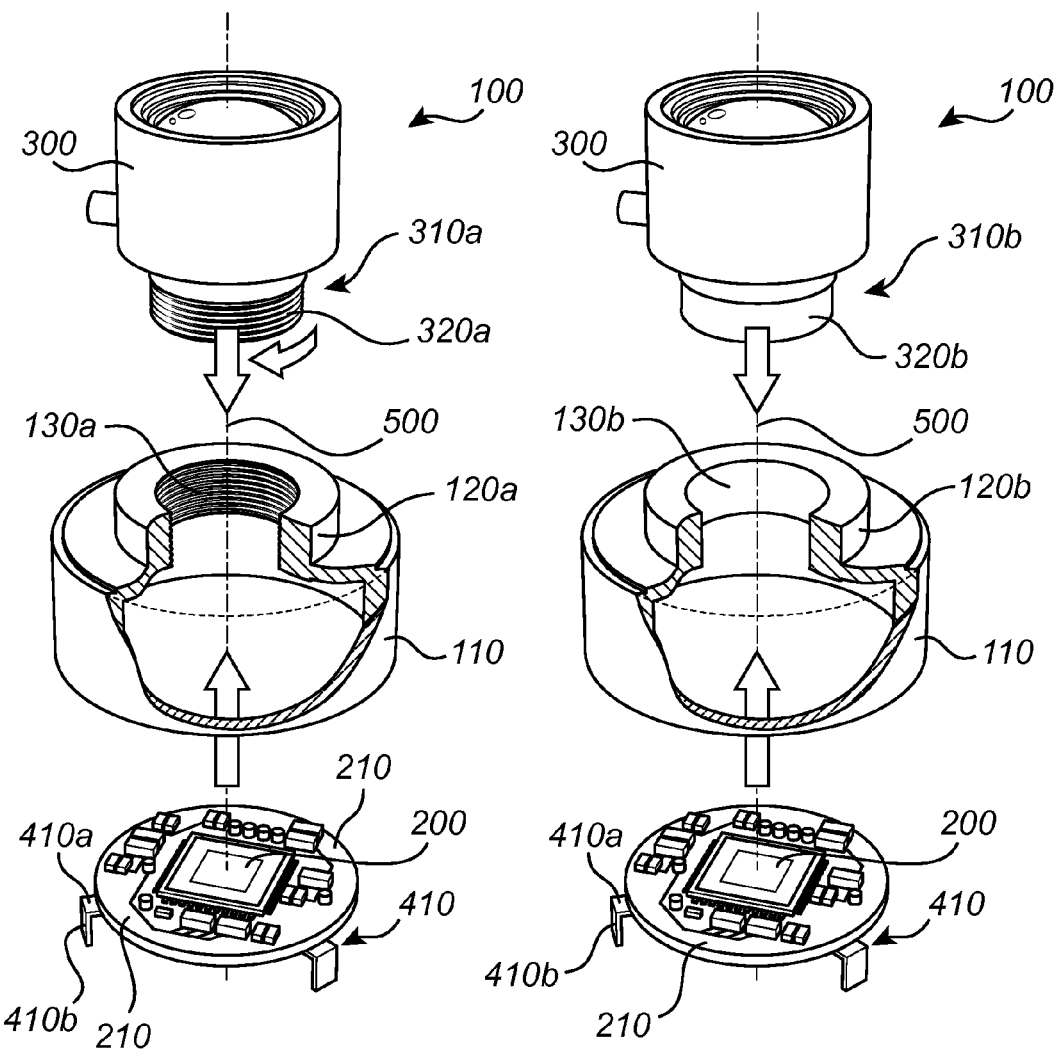
FIG. 1a is a perspective exploded view of an embodiment of the inventive camera with parts broken away.
FIG. 1b is a perspective exploded view of an embodiment of the inventive camera with parts broken away.

The present invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

The inventive camera comprises a sensor, a lens and a housing. The sensor described herein may be an image sensor, such as, e.g., a CMOS, a CCD, a microbolometer or similar. The lens may be a lens with zooming capabilities and may be an objective comprising a plurality of lenses.

During assembly of the camera, the lens, or a lens reference surface, and the image sensor are aligned in relation to each other. A position of at least one of the sensor and the lens is adjusted such that the sensor is positioned at a predetermined angle in relation to an optical axis of the lens. In one embodiment, a position of at least one of the sensor and the lens is adjusted such that the sensor is perpendicularly positioned in relation to the optical axis of the lens.

The step of adjusting a position of at least one of the sensor and the lens may involve adjusting at least one of a position in an orthogonal coordinate system and an angle of the sensor and/or the lens. Thus, in one embodiment, the sensor and/or the lens is moved a distance and/or tilted. Hence, the adjusting of the sensor and/or the lens may be realized in three axes by providing a tilting motion around the first and second axis and movement in a direction of the third axis, the three axes being orthogonal to each other. In zooming cameras it is advantageous to be able to calibrate the camera by both adjusting a position and an angle of the sensor and/or the lens.

The step of adjusting a position of at least one of the sensor and the lens may involve a person looking at a resulting image and performing the step in view of the image. Alternatively, this process is performed automatically. Furthermore, a laser may be used when aligning the components of the image collector arrangement of the camera. Any active alignment system may be used when aligning the components of the image collector arrangement of the camera.

The sensor and the lens are fixed in relation to each other by fixing at least one of them in relation to the housing. In one embodiment, one of the sensor and the lens is fixed in relation to the housing before the step of adjusting and, after that, a position of the other of the sensor and the lens is adjusted. Thereafter, the other of the sensor and the lens is fixed in relation to the housing. The fixing in relation to the housing is performed using laser welding.

During laser welding, a laser beam is directed towards parts that are to be attached to each other. The laser beam provides a concentrated heat source, allowing for narrow, deep welds and high welding rates. Continuous or pulsed laser beams may be used and the laser may, e.g., be a solid-state laser, a gas laser, or a laser diode. With laser welding, there is no need to add material, such as in MIG (metal inert gas) welding, and it is a contactless joining method.

FIGS. 1a and b are perspective exploded views of two embodiments of the inventive camera 100 having a sensor 200, a lens 300, and a housing 110. A part of the housing 110 is broken away in both FIGS. 1a and b.

In FIG. 1a, the lens 300 has an attachment portion 310a having an outside threaded portion 320a. The housing 110 has a lens carrier 120a having an inside threaded portion 130a. When attaching the lens 300 to the housing 110, the outside threaded portion 310a of the lens 300 is arranged to be screwed into the inside threaded portion 130a of the lens carrier 120a.

In FIG. 1b, the lens 300 has an attachment portion 310b having an insert 320b. The housing 110 has a lens carrier 120b having a receiving portion 130b. When attaching the lens 300 to the housing 110, the insert 310b of the lens 300 is arranged to be slid into the receiving portion 130b of the lens carrier 120b.

Next, attachment of the sensor will be described with reference to FIGS. 1a and b.

The sensor 200 is attached to a carrier 210 which may be referred to as a sensor carrier 210. The sensor 200 may, e.g., be soldered to the sensor carrier 210. The sensor carrier 210 is here a PCB (printed circuit board). In one embodiment, components such as, e.g., a CPU and a memory are attached to the PCB. The PCB may comprise a contact which is arranged to be connected to at least one cable. The at least one cable may, e.g., be an Ethernet cable.

A plurality of connection plates 410 are used for fixing the carrier 210 to the housing 110. It is to be noted that any number of connection plates may be used. The connection plates may, e.g., be made of steel.

In this embodiment, the connection plates 410 are realized as right-angled and having a first portion 410a and a second portion 410b. The first portion 410a and the second portion 410b are arranged perpendicularly to each other. The first portion 410a and the second portion 410b may be two separate components that have been soldered together or may be one component that has been bent accordingly.

The first portions 410a of the plurality of connection plates 410 are attached to the carrier 210. The plurality of connection plates 410 may be attached to the carrier 210 using, e.g., soldering. The soldering may be done in a so called pick and place process.

A position of the sensor carrier 210 is adjusted such that the sensor 200 is positioned at a predetermined angle in relation to an optical axis 500 of the lens 300. The predetermined angle may be 90°. The carrier 210 is then laser welded in relation to the housing 110. More specifically, the second portions 410b of the plurality of connection plates 410 are laser welded to an inside of the housing 110.

Figure 1C:
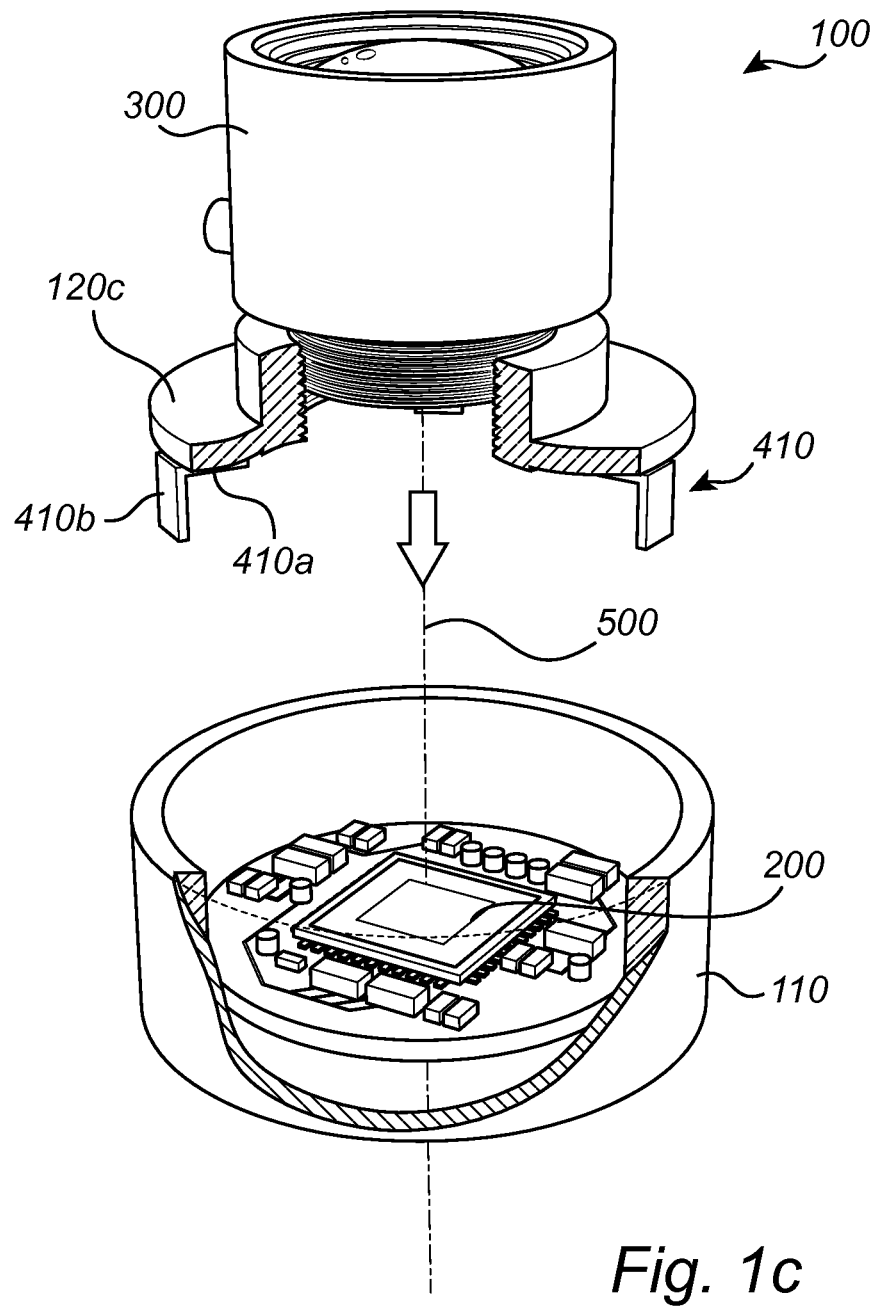
FIG. 1c is a perspective partly exploded view of an embodiment of the inventive camera with parts broken away.

FIG. 1c is a perspective partly exploded view of an embodiment of the inventive camera 100 having a sensor 200, a lens 300, and a housing 110. A part of the housing 110 is broken away. In this embodiment, the lens carrier 120c is a separate component. The lens 300 is attached to the lens carrier 120c in accordance with the embodiment described in connection with FIG. 1a. A plurality of connection plates 410, described in connection with FIGS. 1a and b, are attached to the lens carrier 120c.

The sensor 200 is fixed in relation to the housing 110. A position of the lens carrier 120c is adjusted such that the sensor 200 is positioned at a predetermined angle in relation to an optical axis 500 of the lens 300. The predetermined angle may be 90°. The lens carrier 120c is then laser welded in relation to the housing 110. More specifically, the second portions 410b of the plurality of connection plates 410 are laser welded to an inside of the housing 110.

Figure 2:
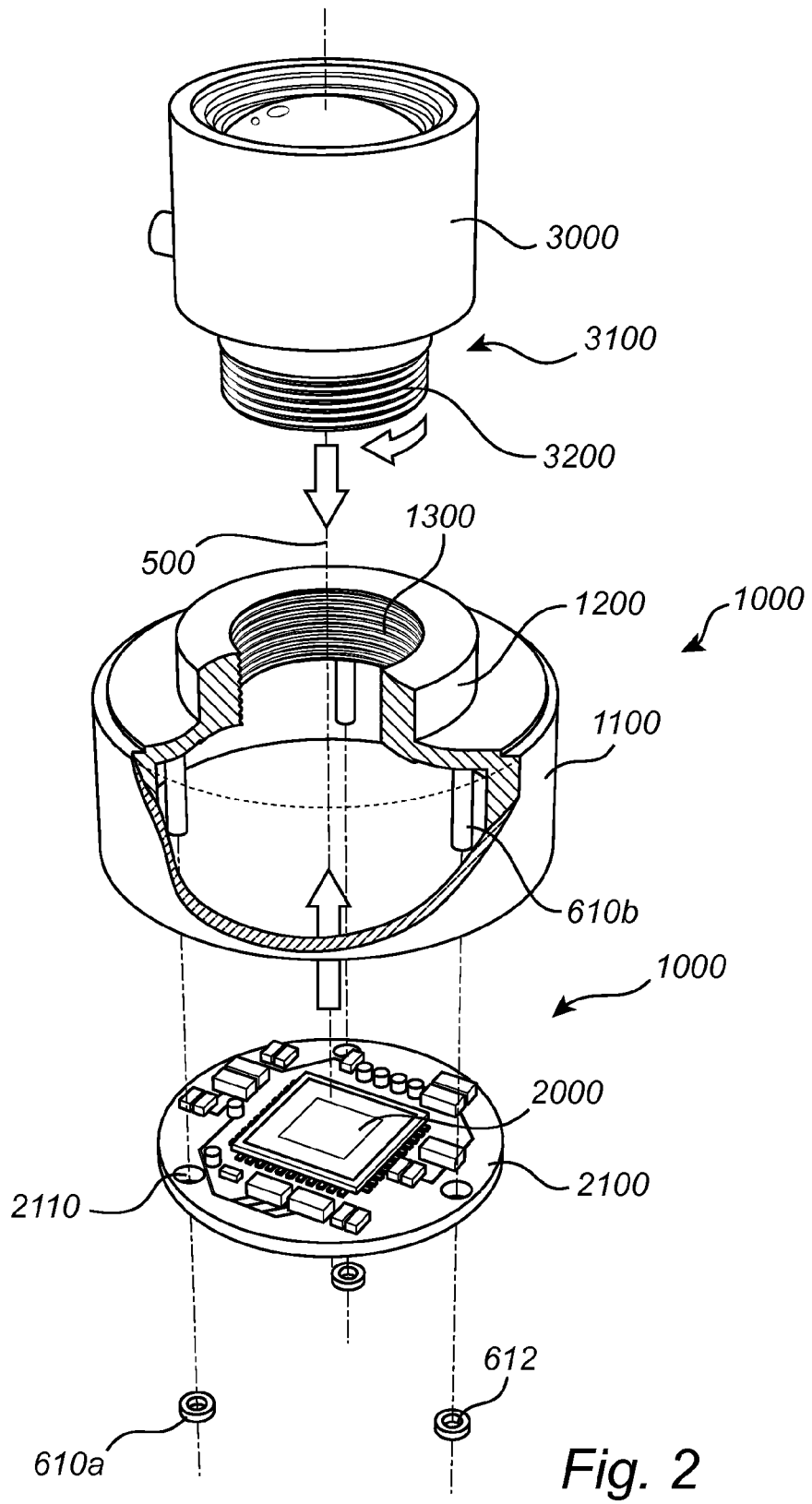
FIG. 2 is a perspective exploded view of an embodiment of the inventive camera with parts broken away.

FIG. 2 is a perspective exploded view of an embodiment of the inventive camera 1000 having a sensor 2000, a lens 3000, and a housing 1100. A portion of the housing has been broken away for illustrative purposes.

The lens 3000 is attached to the lens carrier 1200 by screwing the outside threaded portion 3200 into the inside threaded portion 1200.

Figure 4:
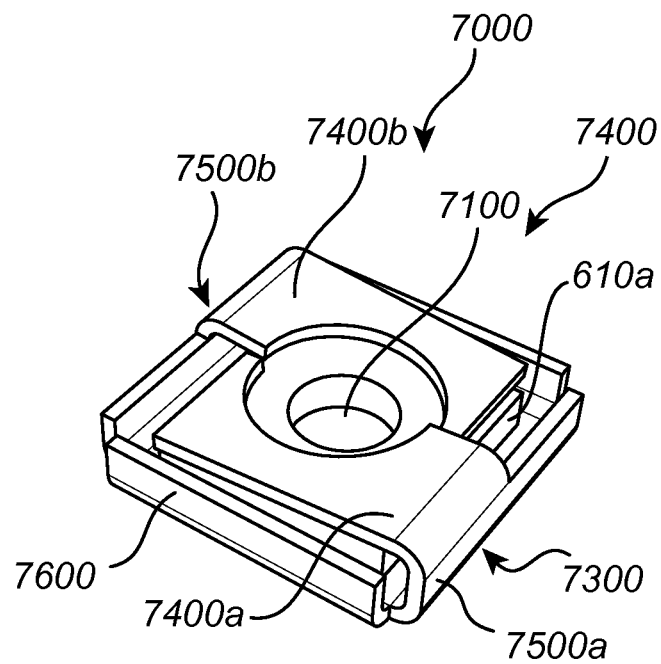
FIG. 4 is a perspective view of an embodiment of an inventive retainer.

A plurality of connection plates 610a are used for fixing the carrier 2100, to the housing 1100. The plurality of connection plates 610a have openings 612 and are embodied as plates. The plates may, e.g., be circular, quadratic, rectangular, triangular, or any other suitable shape. The connection plates may, e.g., be made of steel, particularly stainless steel. An example of a circular connection plate is illustrated in FIG. 2. FIG. 4 illustrates an example of a quadratic connection plate.

The carrier 2100 has openings 2110. The connection plates 610a may be attached to the carrier 2100 using, e.g., soldering or laser welding. The connection plates 610a may be attached to the carrier 2100 such that the openings 612 of the connection plates 610a and openings 2110 of the carrier 2100, coincide. In other words, the connection plates may be arranged on the carrier such that the openings 612 of the connection plates continue into the openings of the carrier. The connection plates are attached to the carrier such that pegs may be inserted through the openings 612 of the connection plates and the carrier. The openings 612 of the connection plates 610a need not be centered in relation to the openings 2110 of the carrier 2100. A certain amount of play is possible.

A plurality of pegs 610b are attached to the housing 1100. If the housing is made of plastic, the pegs may, e.g., be injection molded with the rest of the housing. Metallic pegs may be arranged in a plastic housing by means of, e.g., insert moulding or gluing. If the housing is made of metal, the pegs may be formed with the rest of the housing, e.g., by turning or milling. Hence, the pegs 610b may, e.g., be made of metal or plastic.

Each peg 610b has a first and a second end, the second end being attached to the carrier.

The first ends of the pegs 610b are inserted through the openings of the connections parts 610a and the openings 2110. A position of the sensor carrier 2100 is adjusted such that the sensor 2000 is positioned at a predetermined angle in relation to an optical axis 500 of the lens 3000. The predetermined angle may be 90°. The carrier 2100 is laser welded in relation to the housing 1000. More specifically, the pegs 610b and the connection plates 610a are laser welded to each other.

In one embodiment, a first set of connection plates are attached to the carrier. The first set of connection plates may comprise one connection plate for each opening 612 in the carrier 2110. The connection plates may be attached to the carrier 2110 in a pick-and-place process, e.g., using soldering. A second set of connection plates, which may comprise one connection plate for each opening 612 in the carrier 2110, are arranged on the first set of connection plates 610a. The first ends of the pegs 610b are inserted through the openings of the first and second set of connections parts and the openings 2110. Alternatively, the first ends of the pegs 610b are inserted through the openings of the first set of connection plates prior to arranging the second set of connections parts. After that, the second set of connections parts are slipped over the first ends of the pegs 610b. A position of the sensor carrier 2100 is adjusted such that the sensor 2000 is positioned at a predetermined angle in relation to an optical axis 500 of the lens 3000. The predetermined angle may be 90°. The second set of connection plates are laser welded to the first set of connections parts and to the pegs 610b.

Figure 3:
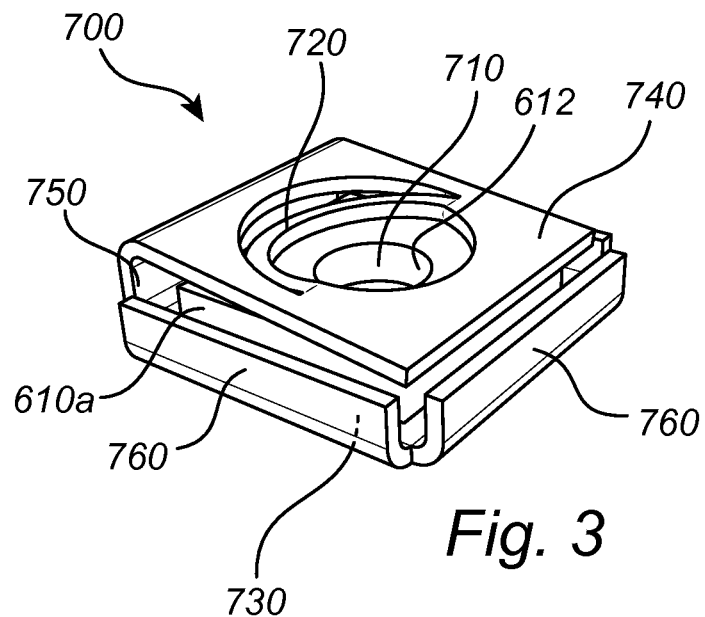
FIG. 3 is a perspective view of an embodiment of an inventive retainer.

FIG. 3 is a perspective view of an embodiment of an inventive retainer. The retainer 700 is arranged to receive a connection plate 610a embodied as a plate.

The retainer 700 can hold a connection plate 610*a* in place, e.g., after having adjusted a position of the sensor in relation to the optical axis of the lens. This enables holding connection plates in place during fixing of the carrier in relation to the housing. Thus, the connection plates can be held in place during laser welding.

The retainer 700 has a bottom plate 730 and a top plate 740. The bottom plate 730 and the top plate 740 are arranged to enclose a connection plate 610*a* arranged in the retainer 700.

The retainer 700 has a resilient part 720 providing a downward resilient force. The resilient part 720 may also be referred to as a pressing portion. The resilient part 720 is arranged to provide a resilient force towards the bottom plate 730 of the retainer 700. The resilient part 720 may be realized as an arc cut out in the top plate 740. Additionally, the top plate 740 provides a force towards the bottom plate 730 of the retainer 700. When laser welding the connection plate 610*a* to the retainer 700, a portion of the resilient part 720 may be laser welded to the connection plate 610*a*.

A curved portion 750 of the retainer 700 functions as a support for the connection plate 610*a*. The top plate 740 and the bottom plate 730 are connected by the curved portion 750. The plates 730, 740 and the curved portion 750 may be embodied as one plate that has been bent accordingly.

The bottom plate 730 may further comprise at least one support 760. The at least one support 760 may be formed by bending a portion of the bottom plate 730. The at least one support may be arranged to support a connection plate 610*a* arranged in the retainer 700.

The retainer 700 has openings 710 in the bottom plate 730 and the top plate 740. A peg 610*b* may be inserted through the openings 710 of the retainer 700. When a connection plate 610*a* is arranged in the retainer 700, a peg 610*b* may be inserted through the openings 710 of the retainer 700 and through the opening 612 of the connection plate 610*a*.

FIG. 4 is a perspective view of an embodiment of an inventive retainer. The retainer 7000 is arranged to receive a connection plate 610*a* embodied as a plate. The retainer 7000 can hold a connection plate 610*a* in place, e.g., after having adjusted a position of the sensor in relation to the optical axis of the lens. This enables holding connection plates in place during fixing of the carriers in relation to the housing. Thus, the connection plates can be held in place during laser welding.

The retainer 7000 has a bottom plate 7300 and a top plate 7400. The bottom plate 7300 and the top plate 7400 are arranged to enclose a connection plate 610*a* arranged in the retainer 7000. The top plate comprises two portions, 7400*a* and 7400*b*. The two portions 7400*a* and 7400*b* may also be referred to as pressing portions. The portions 7400*a* and 7400*b* are arranged to provide a downward resilient force. The resilient force is arranged to be directed towards the bottom plate 7300 of the retainer 7000. The portions 7400*a* and 7400*b* may be realized as the top plate 7400 cut in two pieces and connected to curved portions 7500*a* and *b*, respectively.

The curved portions 7500*a* and *b* function as a support for the connection plate 610*a*. The top plate 7400 and the bottom plate 7300 are connected by the curved portions 7500*a* and *b*. In one embodiment, the retainer 7000 has been realized through bending top plate 7400 and the bottom plate 7300 accordingly and thus creating the curved portions 7500*a* and *b*.

The retainer 7000 has openings 7100 arranged in the top plate 7400 and the bottom plate 7300. A peg 610*b* may be inserted through the openings 7100. When a connection plate 610*a* is arranged in the retainer 7000, a peg 610*b* may be inserted through the openings 7100 of the retainer 7000 and through the opening 612 of the connection plate 610*a*.

The opening 7100 in the top plate 7400 is arranged between the portions 7400*a* and 7400*b*.

When laser welding the connection plate 610*a* to the retainer 7000, a portion of the portions 7400*a* and 7400*b* may be laser welded to the connection plate 610*a*.

The bottom plate 7300 may further comprise at least one support 7600. The at least one support 7600 may be formed by bending a portion of the bottom plate 7300. The at least one support 7600 may be arranged to support a connection plate 610*a* arranged in the retainer 7000.

Figure 5:
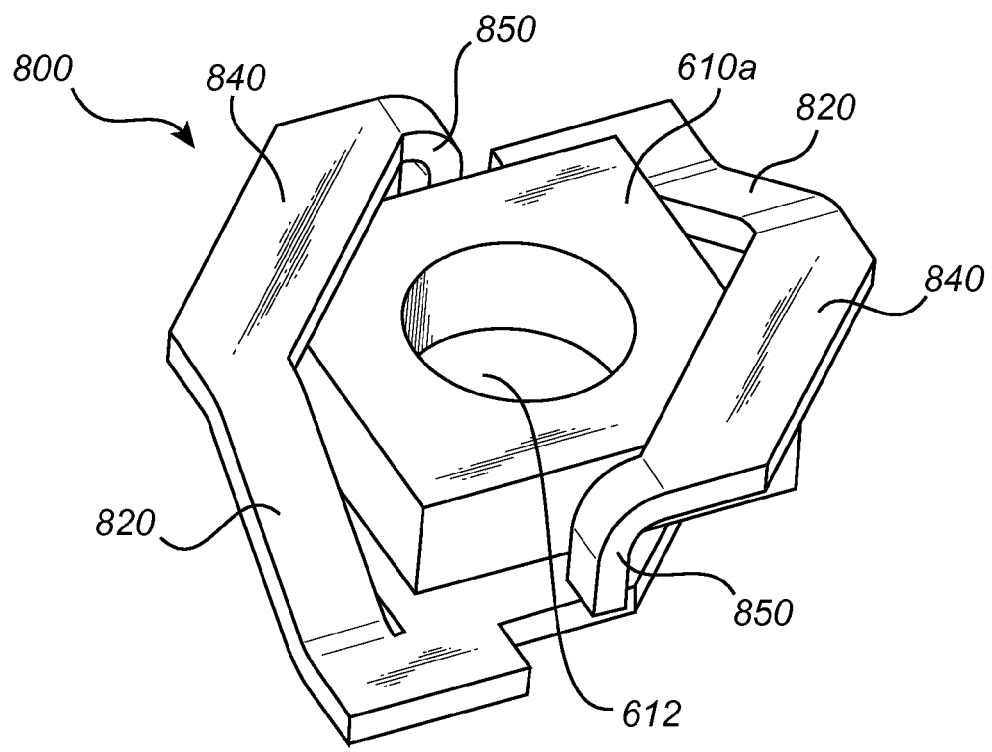
FIG. 5 is a perspective view of an embodiment of an inventive retainer.
Figure 6:
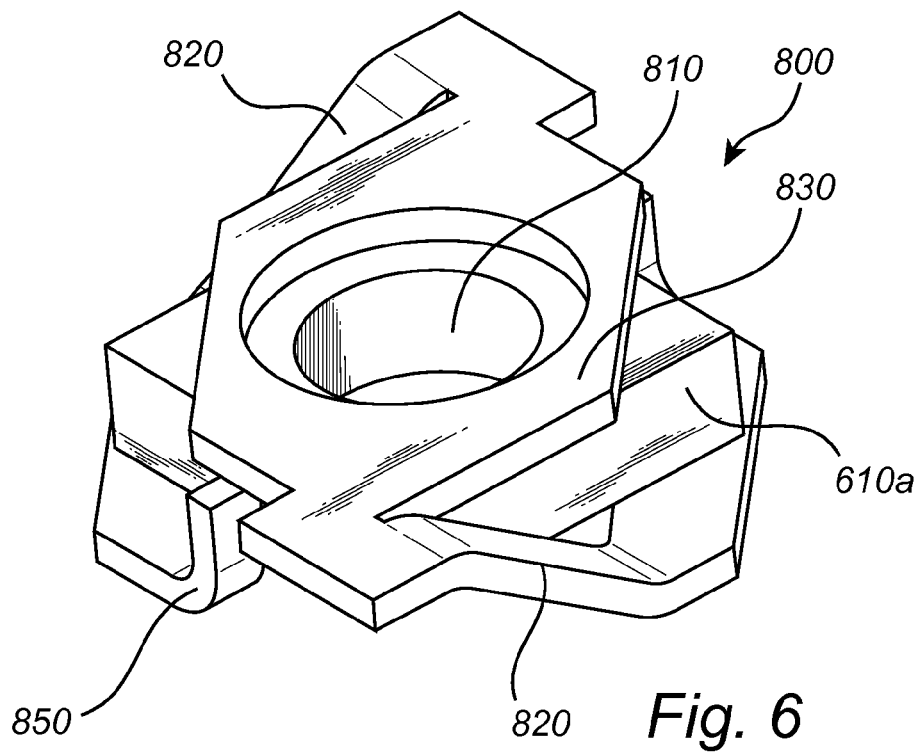
FIG. 6 is a perspective view of a bottom of the inventive retainer of FIG. 5.

FIG. 5 is a perspective view of an embodiment of an inventive retainer. FIG. 6 is a perspective view of the embodiment of an inventive retainer of FIG. 5 seen from below. The retainer 800 is arranged to receive a connection plate 610*a* embodied as a plate.

The retainer 800 can hold a connection plate 610*a* in place, e.g., after having adjusted the image sensor in relation to the optical axis. This enables holding connection plates in place during fixing of the carrier in relation to the housing. Thus, the connection plates can be held in place during laser welding.

The retainer 800 has a bottom plate 830, two pressing portions 840, two resilient plates 820, and two supports 850. The bottom plate 830, the pressing portions 840, the resilient plates 820, and the supports 850 are arranged to enclose a connection plate 610*a* arranged in the retainer 800.

The pressing portions 840 are arranged to provide a resilient force in a direction towards the bottom plate 830. The bottom plate 830 is arranged to provide a resilient force in a direction towards the pressing portions 840. The pressing portions 840 may also be referred to as a top plate.

The pressing portions 840 are at one end connected to a support 850 and at the other end connected to a resilient plate 820. In FIGS. 5 and 6 the connection plate 610*a* is quadratic. The pressing portions 840 extend over two of the corners of the connection plate 610*a*. The pressing portions 840 extend over a pair of diagonally arranged corners of the connection plate 610*a*.

The resilient plates 820 are at one end connected to the bottom plate 830 and at the other end to a pressing portion 840. The resilient plates 820 are arranged at an angle in relation to the pressing portions 840 and/or the bottom plate 830. The angle may, e.g., be 45°. When laser welding the connection plate 610*a* to the retainer 800, any portion of the retainer 800 may be laser welded to the connection plate 610*a*.

The supports 850 are at one end connected to the bottom plate 830 and at the other end to a pressing portion 840. The supports 850 and the resilient plates 820 may function as a support for the connection plate 610*a*. The supports 850 and the resilient plates 820 may be arranged to provide the resilient forces.

The retainer 800 has an opening 810 in the bottom plate 830. A peg 610*b* may be inserted through the opening 810 of the retainer 800. When a connection plate 610*a* is arranged in the retainer 800, a peg 610*b* may be inserted through the opening 810 of the retainer 800 and through the opening 612 of the connection plate 610*a*.

The retainer 800 may be manufactured by cutting a plate accordingly. As an example, the opening 810 is cut. A first elongate part comprising a resilient plate 820, a pressing portion 840 and a support 850 is cut. Then a second elongate part comprising the second resilient plate 820, the second pressing portion 840 and the second support 850 is cut. The first and second elongate parts are bent accordingly.

Figure 7:
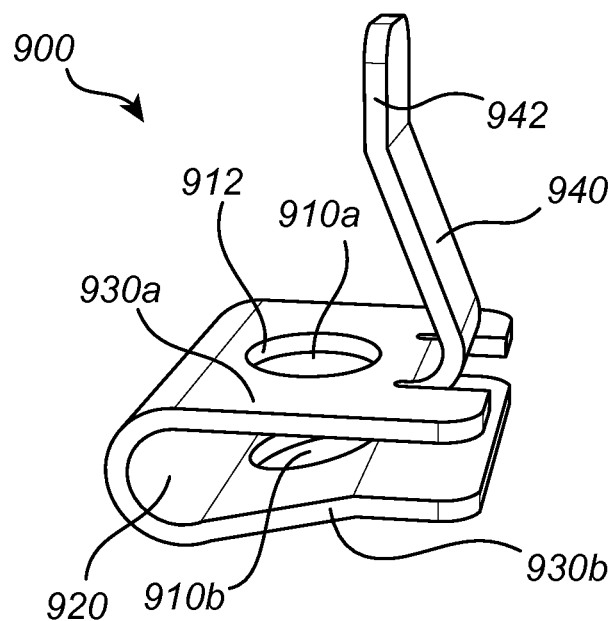
FIG. 7 is a perspective view of an embodiment of an inventive retainer.

FIG. 7 is a perspective view of an embodiment of an inventive retainer. The retainer 900 is arranged to receive a connection plate 610a embodied as a plate. The retainer 900 has a first opening 910a and a second opening 910b. A peg 610b may be inserted through the openings 910a and 910b. When a connection plate 610a is arranged in the retainer 900, a peg 610b may be inserted through the openings 910a and 910b of the retainer 900 and through the opening 612 of the connection plate 610a.

The retainer 900 can hold a connection plate 610a in place. A curved portion 920 of the retainer may function as a support for the connection plate 610a. The retainer 900 is embodied as two plates 930a and 930b connected by the curved portion 920. The curved portion 920 may be arranged to provide a resilient force acting in a direction from the plate 930a towards plate 930b and/or in a direction from the plate 930b towards plate 930a. The plates 930a and 930b and the curved portion 920 may be embodied as one plate that has been bent accordingly. The plate 930a comprises the opening 910a and the plate 930b comprises the opening 910b.

A resilient part 940 extends from the plate 930a. The resilient part extends in a direction of a symmetry axis of the openings 910a and 910b. The resilient part 940 is arranged to provide a resilient force in a direction orthogonal to the symmetry axis of the openings 910a and 910b. The resilient part 940 has a pressing portion 942 and a resilient portion. The resilient portion extends at an angle in relation to the symmetry axis of the openings 910a and 910b. If a peg 610b is inserted into the openings 910a and 910b, the pressing portion 942 is arranged to abut on a portion of the peg 610b. The pressing portion 942 may also be referred to as a peg portion.

The retainer 900 may be used in combination with, e.g., the inventive camera of FIG. 2. The connection plates 610a are attached to the carrier 2100. The retainers 900 are clipped around the connection plates 610a and around an edge of the sensor carrier 2100. The connection plates 610a are then located inside the retainers 900. The pegs 610b are inserted through the openings 910a, 910b, and 612. When adjusting the lens carrier 2100 for adjusting the sensor 2000 in relation to the optical axis 500, the retainers 900 may move in relation to the connection plates 610a. Once a proper alignment is achieved, the retainers 900 are laser welded to the connection plates 610a and to the pegs 610b. Thereby, the position of the sensor carrier 2100 (and, hence, the sensor 2000) is fixed in relation to the housing 1100 (and, hence, the lens 3000).

In one embodiment, the pressing portion 942 is laser welded to the portion of the peg 610b onto which it is arranged to abut. In one embodiment, the peg 610b is laser welded to a brim 912 of the opening 910a.

Figure 8:
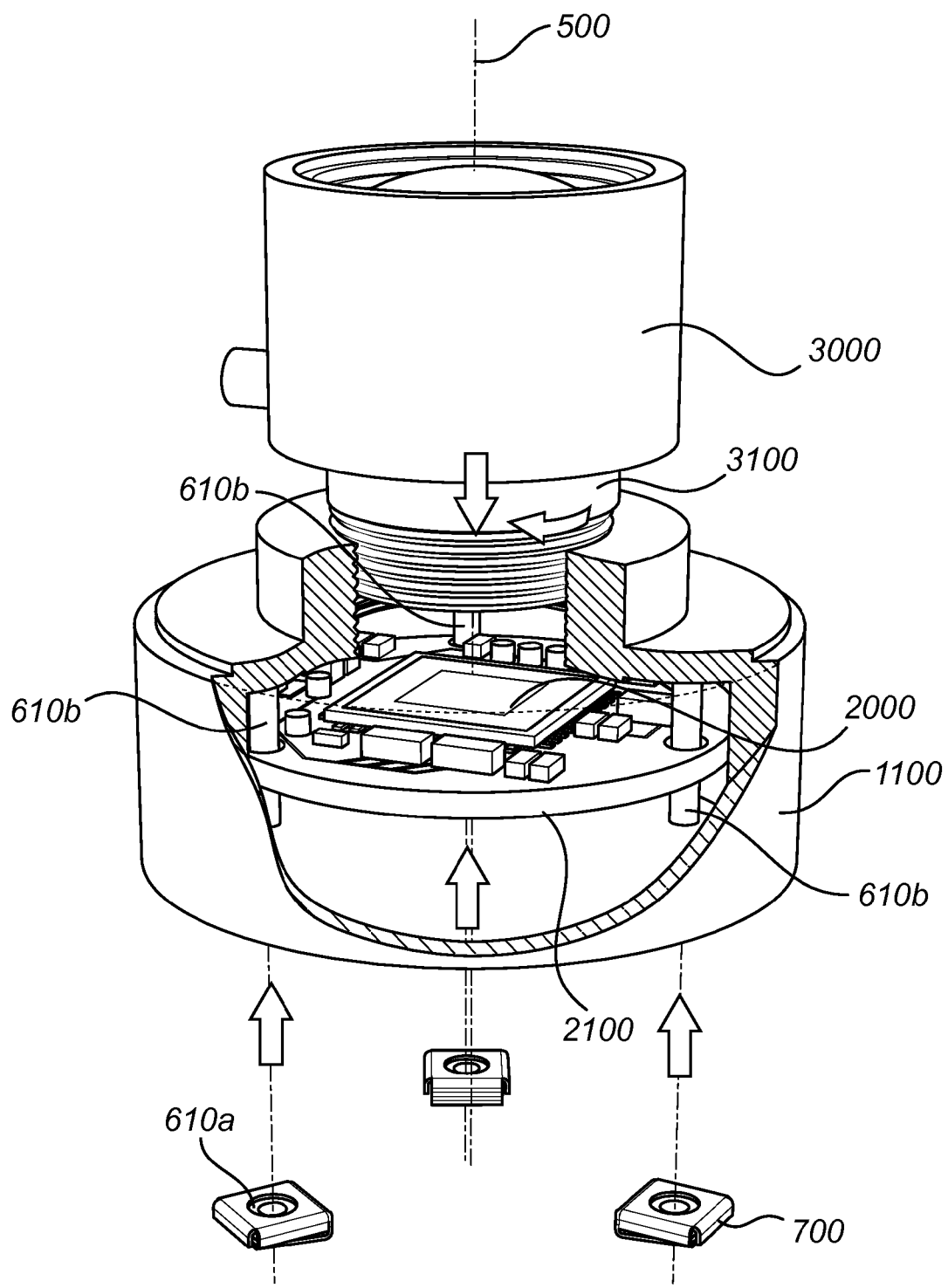
FIG. 8 is a perspective exploded view, with parts broken away, of an embodiment of the inventive camera of FIG. 2 including the inventive retainer of FIG. 3.

FIG. 8 is a perspective partly exploded view of an embodiment of the inventive camera of FIG. 2 including a plurality of the inventive retainers of FIG. 3. It is to be noted that all or some of the retainers in the embodiment of FIG. 8 may be replaced by the retainers of FIGS. 4-7.

Connection plates 610a are arranged in retainers 700. The retainers 700 are fixed in relation to the carrier 2100 by, e.g., soldering. The connection plates 610 are movable in relation to the retainers 700. The pegs 610b are inserted through the openings of the connection plates 610a and the retainers 700. A position of the sensor carrier 2100 is adjusted until a desirable alignment between the sensor and the lens is achieved. The connection plates 610a are attached to the retainers 700 and the pegs 610b using laser welding.

It is to be noted that all embodiments and features described in this application are applicable on all aspects of the invention.

While the invention has been illustrated and described in detail in the drawings and foregoing description, such illustration and description are to be considered illustrative or exemplary and not restrictive; the invention is not limited to the disclosed embodiments.

As an example, the lens in the embodiment of FIGS. 1, 2 and 8 may be fixed in relation to the housing using any means known to the person skilled in the art. Alternatively, the sensor in the embodiment of FIGS. 1, 2 and 8 may be fixed in relation to the housing using any means known to the person skilled in the art.

As another alternative, in the embodiments of FIGS. 1a, 1b, 2, and 8 the lens may be fixed in relation to the housing in accordance with the embodiment of FIG. 1c. As a further alternative, the lens in the embodiment of FIGS. 1a, 1c, 2, and 8 may be fixed in relation to the housing in accordance with the embodiment of FIG. 1b.

In one embodiment, bore holes are drilled in the retainers in order to simplify the laser welding.

The retainers may have solder pins simplifying the attachment for the retainers to the carriers.

The housing may be arranged in an outer camera housing, or may be made an integrated part of such outer camera housing.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

What is claimed is:

1. A method for assembling a camera comprising a sensor, a lens, and a housing, the method comprising:
    attaching at least one of the sensor and the lens to a carrier, wherein the sensor is attached to a sensor carrier and the lens is attached to a lens carrier;
    arranging a connection plate in a retainer such that an opening in the retainer is aligned with an opening of the connection plate;
    attaching one or more retainers to at least one of the sensor carrier and lens carrier such that the opening of each retainer is aligned with an opening in the carrier to which the retainer is attached;
    inserting a first end of a peg in the opening of the connection plate, in the opening in the carrier to which the retainer is attached, and in the opening of one of the one or more retainers, the peg extending in a direction parallel to the optical axis of the lens, and a second end of the peg being attached to the housing;
    adjusting a position of at least one of the sensor and the lens such that the sensor is positioned at a predetermined angle in relation to an optical axis of the lens;
    laser welding the at least one of the sensor carrier and the lens carrier in relation to the housing such that the sensor and the lens are fixed in relation to each other;

wherein the step of laser welding comprises laser welding the connection plate to at least one of the peg and one of the one or more retainers.

2. The method according to claim 1, wherein the step of laser welding comprises laser welding a portion of the connection plate to the housing.

3. The method according to claim 1, further comprising attaching the connection plate to at least one of the sensor carrier and the lens carrier before arranging the connection plate in the retainer.

4. A camera comprising:
a sensor;
a lens;
a housing;
a sensor carrier to which the sensor is attached;
a lens carrier to which the lens is attached;
one or more connection plates;
one or more retainers that are attached to at least one of the sensor carrier and lens carrier; and
a peg having a first end arranged in the opening of one of the at least one retainers, in the opening of at least one of the connection plates, and in the opening in the carrier to which the retainer is attached, and a second end being attached to the housing, said peg extending in a direction parallel to an optical axis of said lens;
wherein the connection plate is arranged in the retainer such that an opening in each retainer is aligned with an opening in the connection plate;
wherein each of the one or more retainers is attached to at least one of the sensor carrier and lens carrier such that the opening of each retainer is aligned with an opening in the carrier to which the retainer is attached, and such that the opening of the connection plate in the retainer is aligned with the opening in the carrier to which the retainer is attached;
wherein at least one of the sensor carrier and the lens carrier is laser welded to the housing such that the sensor and the lens are fixed in relation to each other;
wherein the connection plate is laser welded to at least one of the peg and one of the one or more retainers.

5. The camera according to claim 4, wherein each of the one or more retainers has at least one pressing portion arranged to apply a resilient force on the at least one connection plate in a direction towards the at least one of the sensor carrier and the lens carrier.

6. The camera according to claim 4, each of the one or more retainers has a peg portion arranged to apply a first resilient force to the peg, and a connection part portion arranged to apply a second resilient force to the at least one connection plate in a direction which is opposite to the direction of the first resilient force.

* * * * *